US012295364B1

(12) United States Patent
Frohnapple et al.

(10) Patent No.: US 12,295,364 B1
(45) Date of Patent: May 13, 2025

(54) NANO PESTICIDAL FORMULATION AND PREPARATION METHOD THEREOF

(71) Applicants: Eric Frohnapple, Houston, TX (US); Alirio Pinango, New Braunfels, TX (US)

(72) Inventors: Eric Frohnapple, Houston, TX (US); Alirio Pinango, New Braunfels, TX (US)

( * ) Notice: Subject to any disclaimer, the term of this patent is extended or adjusted under 35 U.S.C. 154(b) by 0 days.

(21) Appl. No.: 18/783,039

(22) Filed: Jul. 24, 2024

(51) Int. Cl.

| | |
|---|---|
| ***A01N 25/28*** | (2006.01) |
| ***A01N 25/04*** | (2006.01) |
| ***A01N 25/30*** | (2006.01) |
| ***A01N 37/02*** | (2006.01) |
| ***A01N 37/04*** | (2006.01) |
| ***A01N 59/00*** | (2006.01) |
| ***A01N 59/16*** | (2006.01) |

(52) U.S. Cl.
CPC ............. *A01N 25/28* (2013.01); *A01N 25/04* (2013.01); *A01N 25/30* (2013.01); *A01N 37/02* (2013.01); *A01N 37/04* (2013.01); *A01N 59/00* (2013.01); *A01N 59/16* (2013.01)

(58) Field of Classification Search
CPC ........ A01N 25/28; A01N 59/00; A01N 59/16; A01N 25/30
See application file for complete search history.

(56) References Cited

U.S. PATENT DOCUMENTS

2019/0262469 A1* 8/2019 Brinker .............. A61K 47/6923
2022/0143225 A1* 5/2022 Lee .................... A61K 49/1812
2024/0008479 A1* 1/2024 Mechrez ................ A01N 25/24

FOREIGN PATENT DOCUMENTS

CN 105110929 A * 12/2015
WO WO-2021075911 A1 * 4/2021 ............. A61K 47/34

OTHER PUBLICATIONS

Machine translation of CN 105110929 (Dec. 2015).*

* cited by examiner

*Primary Examiner* — John Pak
(74) *Attorney, Agent, or Firm* — FROHNAPPLE

(57) ABSTRACT

The present invention relates to a pesticidal formulation. The formulation comprises active ingredients approved by the EPA for Minimum Risk Pesticides, including nanoscale iron/oxide, nanoscale silica, or a combination thereof encapsulated within micelles. The nanoparticles range in diameter from approximately 10 to 500 nanometers and are complemented by a mixture of corn oil, soybean oil, cinnamon oil, and/or peppermint oil, each constituting 5-25% by weight. Inert ingredients approved by the EPA for Minimum Risk Pesticides act as carriers, stabilizers, surfactants, and/or emulsifiers, comprising bentonite, lauryl sulfate, sodium lauryl sulfate, malic acid, vinegar, and white mineral oil. Methods for preparing the formulation involve micelle formation, nanoparticle encapsulation, and incorporation of EPA-approved ingredients. Upon dilution and application, the formulation exhibits efficacy in pest control while adhering to environmental and safety standards.

8 Claims, 2 Drawing Sheets

NANO PESTICIDAL FORMULATION AND PREPARATION METHOD THEREOF

FIELD OF THE INVENTION

This invention generally relates to agricultural pesticides and more specifically, a pesticidal formulation meeting EPA criteria for minimum risk pesticides. The pesticidal formulation of the present invention addresses concerns regarding environmental and health impacts associated with traditional chemical pesticides.

BACKGROUND OF THE INVENTION

Pesticides are a key agricultural input required to protect seeds and safeguard crops from unwanted plants, insects, bacteria, fungi, and rodents. However, pesticides also have negative health and environmental impacts through contamination of soil, water and non-target plants and animals, which can decrease biodiversity and harm living organisms including humans. According to the Food and Agriculture Organization of the United Nations, FAO, the total pesticides use in agriculture in 2021 was 3.54 million tonnes of active ingredients (Mt), a 4 percent increase with respect to 2020, a 11 percent increase in a decade, and a doubling since 1990. Comparing the most recent decade with the 1990s, the global application of pesticides increased by 53 percent for herbicides, 111 percent for fungicides and bactericides, and 44 percent for insecticides, with increases in the share of herbicides (from 40 percent to 49 percent of total pesticides use) and reductions in the share of insecticides (from 26 percent to 22 percent), and of fungicides and bactericides (from 25 percent to 22 percent).

Despite the vast increase in the amount of pesticides used over the last 30-40 years, the amount of crop loss due to pests has increased from 31% to 37%. There has been a 10-fold increase in insecticide use in the US from 1945 to 2000, yet during this period, total crop losses from insect damage alone have nearly doubled from 7% to 13% (Pimentel). This ever-increasing use of toxic chemical-based pesticides is taking its toll. For example, the total number of pesticide poisonings in the US is estimated at 300,000 per year (EPA). Worldwide, the use of pesticides causes 26 million instances of nonfatal poisonings annually (Richter, 2002), of which 3 million are hospitalized, 750,000 come down with chronic illnesses and 220,000 die (Hart and Pimentel, 2002).

A disadvantage of a pesticide composition that does not comply with minimum risk pesticide conditions is the potential environmental and health risks it may pose. This noncompliance could lead to unintended harm to non-target organisms, such as beneficial insects or aquatic life, as well as risks to human and animal health through exposure during handling, application, or consumption of treated crops. Furthermore, such formulations may not be biodegradable or may accumulate in ecosystems, posing long-term environmental concerns.

The existing process of manufacturing pesticidal compositions involves several intricate steps including surface modification of key ingredients and homogenization under specific conditions. Such complexity may lead to higher production costs, necessitate specialized equipment, and increase the risk of variability in product quality during large-scale manufacturing.

Accordingly, it is apparent that a need exists for an environmentally friendly solution to many of today's agricultural problems. The present invention addresses these issues in an efficient manner, allowing end users to resolve their challenging pest mitigation problems. By utilizing nonhazardous products, farmers can achieve these benefits.

BRIEF SUMMARY OF THE INVENTION

The first aspect of the present invention provides a pesticidal formulation. The pesticidal formulation comprises nanoparticles selected from nanoscale iron/oxide, nanoscale silica and/or a combination thereof. The nanoparticles comprise a diameter within a range of approximately 10 to 500 nanometers. The nanoparticles are encapsulated within micelles at no greater than 3%, a mix of corn oil, soybean oil, cinnamon oil, and/or peppermint oil, each present in a range of 5-25% w/w and the inert ingredients as listed as approved by the EPA for use in a Minimum Risk Pesticide as designated in § 180.950, comprising primarily bentonite, lauryl sulfate, sodium lauryl sulfate, malic acid, vinegar, and white mineral oil acting as a carrier, stabilizer, surfactant, and/or emulsifier to make up a total of 100% w/w.

In an embodiment, the surfactants are fatty acid-based surfactants that are non-ionic. The fatty acid-based surfactants are linear micelle surfactants produced from fractions of plant oils. The fatty acid-based surfactant is Polysorbate 80 or the surfactants commonly used in food or pharmaceutic products.

In another embodiment, the emulsifiers are selected from polysorbates, ethoxylated alcohols, or other emulsifying agents with similar properties.

In yet another embodiment, the micelles encapsulating the nanoparticles have a diameter ranging from approximately 10 nm to 500 nm.

In yet another embodiment, the concentration of nanoscale iron/oxide ranges from approximately 0.2% to 1.5% w/w of the total formulation.

In yet another embodiment, the concentration of nanoscale silica ranges from approximately 0.2% to 1.5% w/w of the total formulation.

The second aspect of the present invention provides a method of preparing a pesticidal formulation. According to the method, a solution with active ingredients of micelles is formed at no greater than 3%, and up to 5-25% w/w each of corn oil, soybean oil, cinnamon oil, and/or peppermint oil. Nanoparticles comprising nanoscale iron/oxide and/or nanoscale silica are introduced into the micelle solution. The nanoparticles are encapsulated within the micelles. The nanoparticles are placed into a colloidal phase between the micelles. The inert ingredients as listed as approved by the EPA for use in a Minimum Risk Pesticide as designated in § 180.950, comprising primarily bentonite, lauryl sulfate, sodium lauryl sulfate, malic acid, vinegar, and white mineral oil acting as a carrier, stabilizer, surfactant, and/or emulsifier are added to make up a total of 100% w/w to obtain the pesticidal formulation.

In an embodiment, the inert ingredients acting as the carrier, stabilizer, surfactant, and/or emulsifier agents self-assemble to form the micelles and the nanoparticles are dispersed uniformly within the micelles.

In another embodiment, the surfactants are fatty acid-based surfactants that are non-ionic. The fatty acid-based surfactants are linear micelle surfactants produced from fractions of plant oils. The fatty acid-based surfactant is Polysorbate 80 or the surfactants commonly used in food or pharmaceutic products.

In yet another embodiment, the emulsifiers are selected from polysorbates, ethoxylated alcohols, or other emulsifying agents with similar properties.

In yet another embodiment, the encapsulated nanoparticles are released from the micelles upon contact with water.

In yet another embodiment, the pesticidal formulation is applied for the intended use at a dilution ratio of 1:250 to 1:1,500 in water.

In yet another embodiment, ingredients of the formulation, both active and inert ingredients, for their intended use are eligible for minimum risk designation under EPA (40 C.F.R. 152.25 (f)(1)).

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention and the claims. A pesticidal formulation and preparation method thereof is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the FIGURES or description below. The present invention will now be described by referencing the appended FIGURES representing preferred embodiments.

Figure 1A:
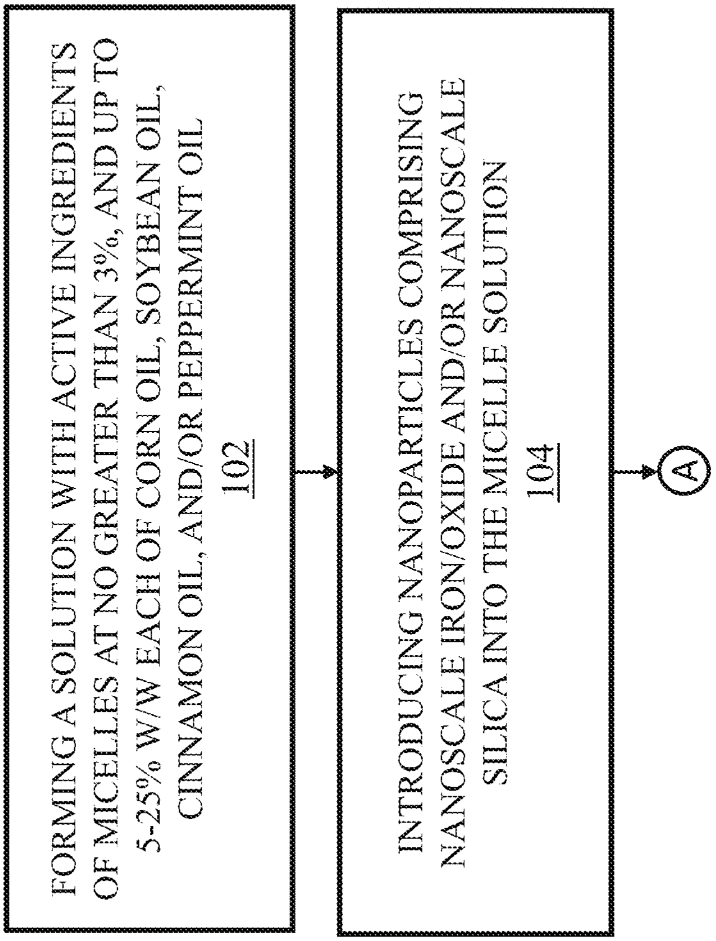
FIGS. 1A-1B-FIGS. 1A-1B illustrate a method of preparing a pesticidal formulation according to various embodiments of the present invention.
Figure 1B:
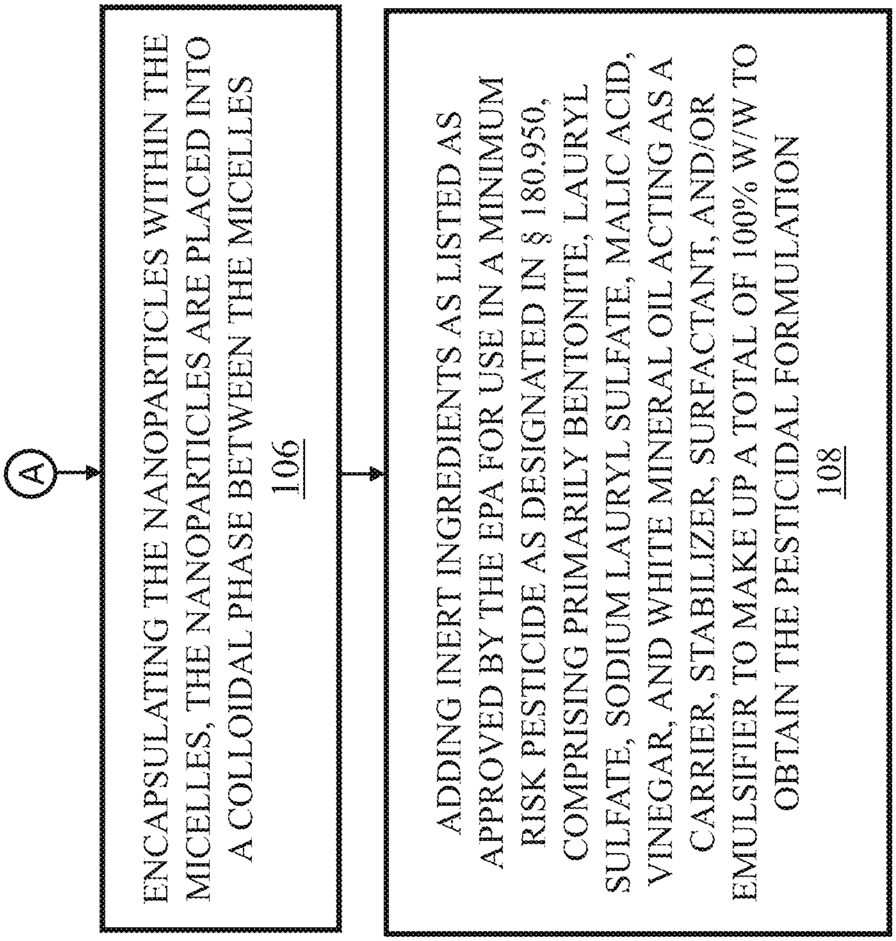

FIGS. 1A-1B illustrate a method of preparing a pesticidal formulation according to various embodiments of the present invention.

At step 102, the method includes forming a solution with active ingredients of micelles at no greater than 3%, and up to 5-25% w/w each of corn oil, soybean oil, cinnamon oil, and/or peppermint oil.

At step 104, the method includes introducing nanoparticles comprising nanoscale iron/oxide and/or nanoscale silica into the micelle solution.

At step 106, the method includes encapsulating the nanoparticles within the micelles. The nanoparticles are placed into a colloidal phase between the micelles.

At step 108, the method includes adding the inert ingredients as listed as approved by the EPA for use in a Minimum Risk Pesticide as designated in § 180.950, comprising primarily bentonite, lauryl sulfate, sodium lauryl sulfate, malic acid, vinegar, and white mineral oil acting as a carrier, stabilizer, surfactant, and/or emulsifier to make up a total of 100% w/w to obtain the pesticidal formulation.

The method utilizes a nano-scale technology to produce the linear micelle surfactant from the fractions of plant oils. Initially, suitable plant oils are selected for their composition and properties. These oils are then subjected to fractionation. Fractionation is a process that separates the different components or fractions of the oil based on their molecular weight, polarity, or other characteristics. This step is crucial because it isolates specific fractions of the plant oils that are optimal for forming micelle structures. The selected fractions from the plant oils undergo a process where they are transformed into linear micelle surfactants. Linear micelles have a specific arrangement where the hydrophobic tails of the surfactant molecules are aligned linearly, surrounded by a hydrophilic shell. During the formation of these linear micelles, nano-scale manipulation techniques are employed. This involves controlling the size, shape, and surface properties of the micelles at the nanometer scale. Nano-scale manipulation ensures that the surfactants exhibit desired characteristics such as stability, solubility, and efficiency in various applications.

The reactive form of the nanoscale iron/oxide and/or the nanoscale silica is encapsulated and placed into the colloidal phase between the micelles. Chemicals used to prepare the micelles are not transferred to the pesticide formula.

The reactive nanoscale iron/oxide may be synthesized through several methods, each tailored to achieve specific properties and applications. The precipitation method involves dissolving iron salts like iron chloride in water, followed by the addition of a reducing agent such as sodium borohydride. This chemical reduction process reduces iron ions, forming nanoscale particles or oxides dispersed in the solution. Thermal decomposition utilizes iron-containing organic compounds such as iron pentacarbonyl, which are heated under controlled conditions to decompose and yield nanoscale iron particles or oxides. Mechanical attrition, through high-energy ball milling or mechanical milling of iron powders, reduces particle size to the nanoscale, enhancing reactivity due to increased surface area. Chemical vapor deposition (CVD) involves vaporizing iron precursors like iron pentacarbonyl and reacting them with a reducing gas such as hydrogen at high temperatures, depositing nanoscale iron particles directly onto a substrate. In Electrochemical synthesis, iron ions are electrochemically reduced in an electrolyte solution, allowing precise control over particle size and reactivity through adjustments in electrode potential and electrolyte composition.

Reactive nanoscale silica particles may be synthesized using various methods. The Stober method involves the hydrolysis of tetraethyl orthosilicate (TEOS) in the presence of water and alcohol (such as ethanol) under basic conditions (using ammonia or sodium hydroxide). This controlled reaction produces nanoscale silica particles with precise size and morphology.

The microemulsion method utilizes water-in-oil microemulsions containing TEOS and surfactants (like cetyltrimethylammonium bromide), mixed with a base catalyst. Within the microemulsion, nanoscale silica particles form within the micelles, offering a method to control particle size and enhance dispersion stability. In the sol-gel method, TEOS or other silane precursors undergo hydrolysis and condensation in a solvent (such as ethanol) with water and a catalyst (acid or base). This sequential process forms a sol, which further condenses to form nanoscale silica particles. This approach allows for fine-tuning of particle properties and compatibility with various applications. Flame synthesis involves the hydrolysis and oxidation of silicon-containing precursors (e.g., silicon tetrachloride) in a high-temperature flame environment. This rapid synthesis method yields nanoscale silica particles with high purity and controlled size, suitable for applications requiring efficient production and precise particle characteristics.

The pesticidal formulation is produced as a concentrate and is activated when in contact with water, releasing the full power of the reactive nano-scale compound. The combination of oils act as a secondary aid in the containment of pests. The oils have antibacterial, antimicrobial and anti-fungicidal properties proven to be effective in the treatment of fungal and bacterial infections.

By following the requirements for a Minimum Risk Pesticide, the pesticidal formulation is biodegradable, a non-petroleum-based product, environmentally safe, non-carcinogenic, non-fuming, and non-toxic.

While the present invention has been described in terms of particular embodiments and applications, in both summarized and detailed forms, it is not intended that these descriptions in any way limit its scope to any such embodiments and applications. It will be understood that many substitutions, changes and variations in the described embodiments, applications and details of the method and system illustrated herein and of their operation can be made by those skilled in the art without departing from the spirit of this invention.

What is claimed is:

1. A pesticidal formulation comprising:

a) nanoparticles, wherein the nanoparticles are selected from nanoscale iron, nanoscale silica or a combination thereof, wherein the concentration of the nanoscale iron ranges from about 0.2% to 1.5% w/w of the total formulation, wherein the concentration of the nanoscale silica ranges from about 0.2% to 1.5% w/w of the total formulation, wherein the nanoparticles comprise a diameter ranging about 10 to 500 nanometers, wherein the nanoparticles are encapsulated within micelles at no greater than 3% w/w of the total formulation;

b) a mix of oils comprising corn oil, soybean oil, cinnamon oil, and peppermint oil, or any combination thereof, present in a range of about 5-25% w/w;

c) at least one surfactant, or at least one emulsifier, or a combination thereof, wherein the at least one surfactant is selected from fatty acid-based surfactants that are non-ionic, and wherein the fatty acid-based surfactants are linear micelle surfactants produced from fractions of plant oils; and d) at least one Inert ingredient selected from bentonite, lauryl sulfate, sodium lauryl sulfate, malic acid, vinegar, or white mineral oil, or a combination thereof, acting as a carrier or stabilizer to make up a total of 100% w/w.

2. The pesticidal formulation of claim 1, wherein the at least one emulsifier is selected from polysorbates or ethoxylated alcohols.

3. The pesticidal formulation of claim 1, wherein the fatty acid-based surfactant is Polysorbate 80.

4. A method of preparing a pesticidal formulation, comprising:

forming a solution with ingredients of micelles at no greater than 3% w/w of the total formulation, and a mix of oils comprising corn oil, soybean oil, cinnamon oil, and peppermint oil, or any combination thereof present in a range of about 5-25% w/w;

introducing nanoparticles comprising nanoscale iron, nanoscale silica, or a combination thereof into the micelle solution, wherein the concentration of the nanoscale iron ranges from about 0.2% to 1.5% w/w of the total formulation, wherein the concentration of the nanoscale silica ranges from about 0.2% to 1.5% w/w of the total formulation, wherein the nanoparticles comprise a diameter ranging from about 10 to 500 nanometers;

encapsulating the nanoparticles within the micelles, wherein the nanoparticles are placed into a colloidal phase;

adding at least one surfactant, or at least one emulsifier, or a combination thereof, wherein the at least one surfactant is selected from fatty acid-based surfactants that are non-ionic, and wherein the fatty acid-based surfactants are linear micelle surfactants produced from fractions of plant oils;

adding at least one Inert ingredient selected from bentonite, lauryl sulfate, sodium lauryl sulfate, malic acid, vinegar, or white mineral oil, or any combination thereof, acting as a carrier or stabilizer to make up a total of 100% w/w to obtain the pesticidal formulation.

5. The method of claim 4, wherein the at least one emulsifier is selected from polysorbates or ethoxylated alcohols.

6. The method of claim 4, wherein the pesticidal formulation is applied for the intended use at a dilution ratio of 1:250 to 1:1,500 in water.

7. The method of claim 4, wherein the resulting pesticidal formulation is 100% biodegradable.

8. The method of claim 4, wherein the fatty acid-based surfactant is Polysorbate 80.

* * * * *